United States Patent [19]

Reagan

[11] Patent Number: 4,807,905

[45] Date of Patent: Feb. 28, 1989

[54] ARRANGEMENT OF WORDS USING THE LAST SYLLABLE THEREOF

[76] Inventor: Daniel F. Reagan, 1335 S. Ivanhoe Way, Denver, Colo. 80224

[21] Appl. No.: 118,440

[22] Filed: Nov. 9, 1987

[51] Int. Cl.[4] .................. B42D 1/00; B42F 21/00; G09B 19/00; G09B 1/00
[52] U.S. Cl. .................................. 281/15 R; 283/36; 434/156; 434/167
[58] Field of Search .................. 283/35, 36, 15 R; 281/3, 5, 1, 2, 15 R; 293/115, 116; 364/419, 900; 434/156, 167, 172, 173, 174; 40/78, 102, 359, 360

[56] References Cited

U.S. PATENT DOCUMENTS

| | | | |
|---|---|---|---|
| 493,552 | 3/1893 | Laning | 283/36 |
| 1,132,333 | 3/1915 | Glisson | 283/36 |
| 1,353,615 | 9/1920 | Savitsky . | |
| 2,091,555 | 8/1937 | Messinger | 434/172 |
| 3,282,268 | 11/1966 | Jacobs . | |
| 3,422,549 | 1/1969 | Grangaard | 434/167 |
| 4,030,211 | 6/1977 | McGinley | 434/167 |
| 4,586,160 | 4/1986 | Amano et al. . | |
| 4,609,357 | 9/1986 | Gleeg | 434/172 |
| 4,650,423 | 3/1987 | Sprague et al. . | |
| 4,688,192 | 8/1987 | Yoshimura et al. | 434/156 |
| 4,713,008 | 12/1987 | Stocker et al. | 434/156 |

*Primary Examiner*—Frank T. Yost
*Assistant Examiner*—Paul M. Heyrana, Sr.
*Attorney, Agent, or Firm*—Klaas & Law

[57] ABSTRACT

An arrangement of words is provided wherein a multiplicity of words are arranged in sequential groupings with each sequential grouping having a plurality of words having the same last syllable and wherein the sequential groupings are arranged in alphabetical order in accordance with the last syllable and the plurality of words in each sequential grouping are arranged in alphabetical order. Also, a book having at least three sections is provided wherein the first section comprises a multiplicity of words arranged in alphabetical order; the second section comprises single-syllable words from the first section arranged in alphabetical order and the third section comprises the multi-syllable words from the first section arranged in accordance with the last syllable as described above.

10 Claims, 1 Drawing Sheet

```
ac-a-de-mi-a
ac-cept-a-ble
ae-ti-ol-o-gy
aft
a-ston-ish-ment
```

```
bag-gy
bau-ble
bel-o-ne-pho-bi-a
berm
bet-ter-ment
```

```
can-ton-ment
cher-i-moy-a
coil
com-press-i-ble
con-chol-o-gy
```

```
depth
de-vel-op-ment
din-gy
di-syl-la-ble
dys-lex-i-a
```

```
ease
e-mol-u-ment
en-do-cri-nol-o-gy
ep-i-the-li-a
eq-ui-ta-ble
```

```
ac-a-de-mi-a
ac-cept-a-ble
ae-ti-ol-o-gy
aft
a-ston-ish-ment bag-gy
bau-ble
bel-o-ne-pho-bi-a
berm
bet-ter-ment can-ton-ment
cher-i-moy-a
coil
com-press-i-ble
con-chol-o-gy depth
de-vel-op-ment
din-gy
di-syl-la-ble
dys-lex-i-a ease
e-mol-u-ment
en-do-cri-nol-o-gy
ep-i-the-li-a
eq-ui-ta-ble
```

FIG. 2

```
aft
berm
coil
depth
ease
```

FIG. 3

| 10 | 12 | 14 |
|---|---|---|
| ac-a-de-mi- | a | ac-a-de-mi-a |
| bel-o-ne-pho-bi- | a | bel-o-ne-pho-bi-a |
| cher-i-moy- | a | cher-i-moy-a |
| dys-lex-i- | a | dys-lex-i-a |
| ep-i-the-li- | a | ep-i-the-li-a |
| ac-cept-a- | ble | ac-cept-a-ble |
| bau- | ble | bau-ble |
| com-press-i- | ble | com-press-i-ble |
| di-syl-la- | ble | di-syl-la-ble |
| eq-ui-ta- | ble | eq-ui-ta-ble |
| ae-ti-ol-o- | gy | ae-ti-ol-o-gy |
| bag- | gy | bag-gy |
| con-chol-o- | gy | con-chol-o-gy |
| din- | gy | din-gy |
| en-do-cri-nol-o- | gy | en-do-cri-nol-o-gy |
| a-ston-ish- | ment | a-ston-ish-ment |
| bet-ter- | ment | bet-ter-ment |
| can-ton- | ment | can-ton-ment |
| de-vel-op- | ment | de-vel-op-ment |
| e-mol-u- | ment | e-mol-u-ment |

Groups: 2, 4, 6, 8

ARRANGEMENT OF WORDS USING THE LAST SYLLABLE THEREOF

FIELD OF THE INVENTION

This invention is directed generally to the field of arranging words for ascertaining the proper spelling of a word and inparticular to an arrangement of words using the last syllable thereof.

BACKGROUND OF THE INVENTION

The standard arrangement of words in spelling lists or dictionaries is to place the words in alphabetical order. While this arrangement is practical for a great number of persons, there exists a need for an arrangement of words which enables a person to more quickly and easily ascertain the correct spelling. This need has been validated through study of student academia at many different levels in our society. Inadequacies in vocabulary and spelling skills fuel the mortality of accomplishment in our educational system and work place. Those suffering from learning disabilities, lack of education or poor phonetic skills, are unable to spell correctly and must resort to using a dictionary. Since this person can not spell or sound the word our properly, the dictionary often is of little use. This is particularly so in relation to multi-syllable words with silent letters.

BRIEF DESCRIPTION OF THE INVENTION

This invention provides an arrangement of multi-syllable words to enable a person to locate a word quickly and easily in order to ascertain the correct spelling of the word wherein the words are arranged in accordance with the last syllables thereof.

In a preferred embodiment of the invention, a multiplicity of words are arranged in sequential groupings, each of which has a plurality of words each having the same last syllable. The sequential groupings are arranged in alphabetical order in accordance with the last syllable thereof. The plurality of words in each sequential grouping are arranged in alphabetical order.

The invention is also directed to a book having at least three sections. The first section of the book comprises a multiplicity of words, the number of which can range from the hundreds to tens of thousands of words, arranged in alphabetical order. The second section of the book comprises the single-syllable words from the first section arranged in alphabetical order. The third section of the book comprises the multi-syllable words from the first section arranged, as described above, in accordance with the last syllables thereof.

BRIEF DESCRIPTION OF THE DRAWING

An illustrative and presently preferred embodiment of the invention is shown in the accompanying drawing in which:

FIG. 1 is an illustration of a portion of an arrangement of words in alphabetical order;

FIG. 2 is an illustration of a portion of an arrangement of single-syllable words in alphabetical order; and FIG. 3 is an illustration of a portion of an arrangement of words in acordance with this invention.

DETAILED DESCRIPTION OF THE INVENTION

In the drawings, twenty-five words are used to describe various aspects of the invention in this application. It is to be understood that the twenty-five words used are for illustration purposes only and that the number of words used in publications in accordance with this invention will range from the hundreds to tens of thousands of words.

In accordance with the invention, a book having at least three sections would be compiled. The book can be of any standard construction such as in a binder, paper-back bound or hard cover bound. In addition to the at least three sections, described more fully below, the book would contain other sections normally associated with publications of spelling lists of words or dictionary listing of words or a thesaurus.

The first section of the at least three sections is illustrated in FIG. 1 in which the twenty-five words are arranged in alphabetical order.

The second section of the at least three sections is illustrated in FIG. 2 in which the five single-syllable words from FIG. 1 are arranged in alphabetical order.

The third section of the at least three sections is illustrated in FIG. 3 in which the twenty multi-syllable words from FIG. 1 are arranged in accordance with a preferred embodiment of this invention.

The words in FIG. 3 are arranged in sequential groupings 2, 4, 6 and 8 in column form having three parts 10, 12 and 14. Part 10 comprises each syllable of each word preceding the last syllable. Part 12 comprises the last syllable of each word. Part 14 comprises all of the syllables of each word. In part 14, all of the syllables are separated by a hyphen but, if desired, the words can be listed without the hyphen. Also if desired, part 14 can be omitted.

As illustrated in FIG. 3, the sequential groupings 2, 4, 6 and 8 are arranged in alphabetical order in accordance with the last syllable thereof. Thus, all of the words in sequential grouping 2 end in "a"; all of the words in sequential grouping 4 end in "b"; all of the words in sequential grouping 6 end in "gy" and all of the words in sequential grouping 8 end in "ment". All of the words in each sequential grouping 2, 4, 6 and 8 are arranged in alphabetical order.

In accordance with a presently preferred embodiment of the invention, the words in the first section would be printed on each page in column form with four columns on each page. There would be about one hundred thousand words in the first section starting with a and ending with z. The words in the second section would be printed on each page in column form with four columns on each page. There would be about five thousand words in the second section starting with a and ending with z. The words in the third section would be printed in column form such as that illustrated in FIG. 3. If part 14 is included, there would be two columns, as illustrated in FIG. 3, on each page, but if part 14 is omitted, there would be three columns on each page. There would be about ninety-five thousand words in the third section with the last syllable thereof starting with a and ending with z. While the above description relates solely to the arrangement of words, it is to be understood that each word can be followed by an explanation such as in a dictionary or a thesaurus.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. An arrangement of words in columnar form comprising:
   a multiplicity of words arranged in columnar form and in sequential groupings, each sequential grouping having a plurality of words;
   said plurality of words in each sequential grouping having the same alphabetical letters forming the last syllable thereof; and
   said sequential groupings being in alphabetical order in accordance with the alphabetical letters forming said last syllable thereof.

2. An arrangement of words as in claim 1 and further comprising:
   said plurality of words in each sequential grouping being in alphabetical order in accordance with the alphabetical letters preceding said last syllable thereof.

3. An arrangement of words as in claim 1 wherein each of said columns comprises:
   at least a first part containing each syllable preceding the last syllable of each word; a second part comprising the last syllable only of each word and a third part comprising all of the syllables of each word.

4. An arrangement of words as in claim 3 wherein:
   each syllable of each word in said first part is separated by a hyphen.

5. An arrangement of words as in claim 4 wherein:
   each of said syllables in said third part are separated by a hyphen.

6. A book having at least three sections comprising:
   a first section having a multiplicity of words arranged in columnar form and in alphabetical order;
   a second section having a plurality of onesyllable words from said first section arranged in columnar form and in alphabetical order; and
   a third section having a plurality of multisyllable words from said first section arranged in columnar form and in sequential groupings, each sequential grouping having a plurality of words;
   said plurality of words in each sequential grouping having the same alphabetical letters forming the last syllable thereof; and
   said sequential groupings being in alphabetical order in accordance with the alphabetical letters forming said last syllable thereof.

7. A book as in claim 6 and further comprising:
   said plurality of words in each sequential grouping being in alphabetical order in accordance with the alphabetical letters preceding said last syllable thereof.

8. A book as in claim 6 wherein each of said columns comprises:
   at least a first part containing each syllable preceding the last syllable of each word; a second part comprising the last syllable only of each word and a third part comprising all of the syllables of each word.

9. A book as in claim 8 wherein:
   each syllable of each word in said first part is separated by a hyphen.

10. A book as in claim 8 wherein:
    said syllables in said third part are separated by a hyphen.

* * * * *

UNITED STATES PATENT AND TRADEMARK OFFICE
CERTIFICATE OF CORRECTION

PATENT NO. : 4,807,905
DATED : February 28, 1989
INVENTOR(S) : Daniel S. Reagan

It is certified that error appears in the above-identified patent and that said Letters Patent is hereby corrected as shown below:

On the title page in the name of the inventor change "F." to --S.--.

Column 2, line 38, cancel "b" and insert therefor --ble--.

The title page should be deleted to appear as per attached title page.

Signed and Sealed this

First Day of August, 1989

Attest:

DONALD J. QUIGG

*Attesting Officer*     Commissioner of Patents and Trademarks

United States Patent [19]

Reagan

[11] Patent Number: 4,807,905
[45] Date of Patent: Feb. 28, 1989

[54] ARRANGEMENT OF WORDS USING THE LAST SYLLABLE THEREOF

[76] Inventor: Daniel F. Reagan, 1335 S. Ivanhoe Way, Denver, Colo. 80224

[21] Appl. No.: 118,440

[22] Filed: Nov. 9, 1987

[51] Int. Cl.⁴ .................. B42D 1/00; B42F 21/00; G09B 19/00; G09B 1/00
[52] U.S. Cl. .................. 281/15 R; 283/36; 434/156; 434/167
[58] Field of Search .................. 283/35, 36, 15 R; 281/3, 5, 1, 2, 15 R; 293/115, 116; 364/419, 900; 434/156, 167, 172, 173, 174; 40/78, 102, 359, 360

[56] References Cited

U.S. PATENT DOCUMENTS

| | | | |
|---|---|---|---|
| 493,552 | 3/1893 | Laning | 283/36 |
| 1,132,333 | 3/1915 | Glisson | 283/36 |
| 1,353,615 | 9/1920 | Savinsky | |
| 2,091,555 | 8/1937 | Messinger | 434/172 |
| 3,282,268 | 11/1966 | Jacobs | |
| 3,422,549 | 1/1969 | Grangaard | 434/167 |
| 4,030,211 | 6/1977 | McGinley | 434/167 |
| 4,586,160 | 4/1986 | Amano et al. | |
| 4,609,357 | 9/1986 | Gleeg | 434/172 |
| 4,650,423 | 3/1987 | Sprague et al. | |
| 4,688,192 | 8/1987 | Yoshimura et al. | 434/156 |
| 4,713,008 | 12/1987 | Stocker et al. | 434/156 |

Primary Examiner—Frank T. Yost
Assistant Examiner—Paul M. Heyrana, Sr.
Attorney, Agent, or Firm—Klaas & Law

[57] ABSTRACT

An arrangement of words is provided wherein a multiplicity of words are arranged in sequential groupings with each sequential grouping having a plurality of words having the same last syllable and wherein the sequential groupings are arranged in alphabetical order in accordance with the last syllable and the plurality of words in each sequential grouping are arranged in alphabetical order. Also, a book having at least three sections is provided wherein the first section comprises a multiplicity of words arranged in alphabetical order; the second section comprises single-syllable words from the first section arranged in alphabetical order and the third section comprises the multi-syllable words from the first section arranged in accordance with the last syllable as described above.

10 Claims, 1 Drawing Sheet

```
        10              12          14
        ↓               ↓           ↓
    ┌─────────────────────────────────────────┐
    │  ac-a-de-mi-        a      ac-a-de-mi-a │
    │  bel-o-ne-pho-bi-   a      bel-o-ne-pho-bi-a │
  2 │  cher-i-moy-        a      cher-i-moy-a │
    │  dys-lex-i-         a      dys-lex-i-a  │
    │  ep-i-the-li-       a      ep-i-the-li-a │
    └─────────────────────────────────────────┘

┌─────────────────────────────────────────┐
    │  ac-cept-a-         ble    ac-cept-a-ble │
    │  bau-               ble    bau-ble      │
  4 │  com-press-i-       ble    com-press-i-ble │
    │  di-syl-la-         ble    di-syl-la-ble │
    │  eq-ui-ta-          ble    eq-ui-ta-ble │
    └─────────────────────────────────────────┘

┌─────────────────────────────────────────┐
    │  ae-ti-ol-o-        gy     ae-ti-ol-o-gy │
    │  bag-               gy     bag-gy       │
  6 │  con-chol-o-        gy     con-chol-o-gy │
    │  din-               gy     din-gy       │
    │  en-do-cri-nol-o-   gy     en-do-cri-nol-o-gy │
    └─────────────────────────────────────────┘

┌─────────────────────────────────────────┐
    │  a-ston-ish-        ment   a-ston-ish-ment │
    │  bet-ter-           ment   bet-ter-ment │
  8 │  can-ton-           ment   can-ton-ment │
    │  de-vel-op-         ment   de-vel-op-ment │
    │  e-mol-u-           ment   e-mol-u-ment │
    └─────────────────────────────────────────┘
```